United States Patent [19]

Divilio et al.

[11] Patent Number: 4,547,344
[45] Date of Patent: Oct. 15, 1985

[54] MULTIPLE PIECE CATALYTIC CONVERTER FLANGE

[76] Inventors: Franklin D. Divilio, 6250 Thornridge La., Greendale, Wis. 53129; Daniel G. Woda, 331 E. Wilbur Ave., Milwaukee, Wis. 53207

[21] Appl. No.: 530,507
[22] Filed: Sep. 9, 1983
[51] Int. Cl.⁴ ............................................. B01J 12/00
[52] U.S. Cl. ..................... 422/310; 422/49; 422/177; 422/168; 285/415
[58] Field of Search ................ 181/243; 285/368, 412, 285/414, 415; 60/299, 302; 422/179, 310, 168, 49, 177

[56] References Cited

U.S. PATENT DOCUMENTS 3,515,416 6/1970 Pickert ............................ 285/368 X
4,397,486 8/1983 Ohya .................................. 285/368

Primary Examiner—L. T. Hix
Assistant Examiner—Brian W. Brown
Attorney, Agent, or Firm—Andrus, Sceales, Starke & Sawall

[57] ABSTRACT

A replacement multiple piece flange for a catalytic converter includes a first piece having an arcuate edge for engagement with the curved surface of the outlet pipe on the catalytic converter and a groove for engagement with the web extending from the side of the catalytic converter. A second flange piece also has an arcuate edge for engagement with yet another curved surface of the outlet pipe on the catalytic converter and a groove for engagement with the web. The multiple piece flange is also provided with a plurality of openings which facilitate the assembly of the flange and its installation on the automobile and exhaust system.

6 Claims, 4 Drawing Figures

MULTIPLE PIECE CATALYTIC CONVERTER FLANGE

BACKGROUND OF THE INVENTION

This invention relates to catalytic converter flanges and more particularly to a multiple piece replacement flange for use in an exhaust system between the catalytic converter and the muffler pipe leading from the catalytic converter.

Heretofore, when the original flange on a catalytic converter failed due to corrosion, it was necessary to replace the entire catalytic converter due to the fact that there was no single replacement flange that could be used on a number of different catalytic converters.

Therefore, it is an object of the present invention to provide a catalytic converter flange that permits an easy and inexpensive replacement of the existing flange on a catalytic converter and may be used on a great many different styles of catalytic converters.

SUMMARY OF THE INVENTION

A replacement multiple piece flange for a catalytic converter includes a first piece having an arcuate surface for engagement with the curved surface of the outlet pipe on the catalytic converter and a groove for engagement with the web extending outwardly from the side of the converter.

In accordance with yet another aspect of the invention, the multiple piece flange is provided with a second piece also having an arcuate edge for engagement with yet another curved portion of the outlet pipe of the catalytic converter and a notch for engagement with the web.

In accordance with yet another aspect of the invention, portions of the second flange piece which mate with portions of the first flange piece are offset from the main body portion of the second flange piece so as to provide a uniform plane surface on the flange for engagement with the weld that was left after removing the original flange.

In accordance with yet another aspect of the invention, the multipe piece flange is provided with a plurality of openings to facilitate fastening the flange pieces to each other, fastening the flange to a bracket suspended from the frame of the automobile and for fastening the flange to yet another flange on the muffler pipe leading from the catalytic converter.

The present invention thus provides a replacement flange for a catalytic converter that is inexpensive and easy to install and eliminates the need for replacing the entire catalytic converter upon failure of the original flange piece.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
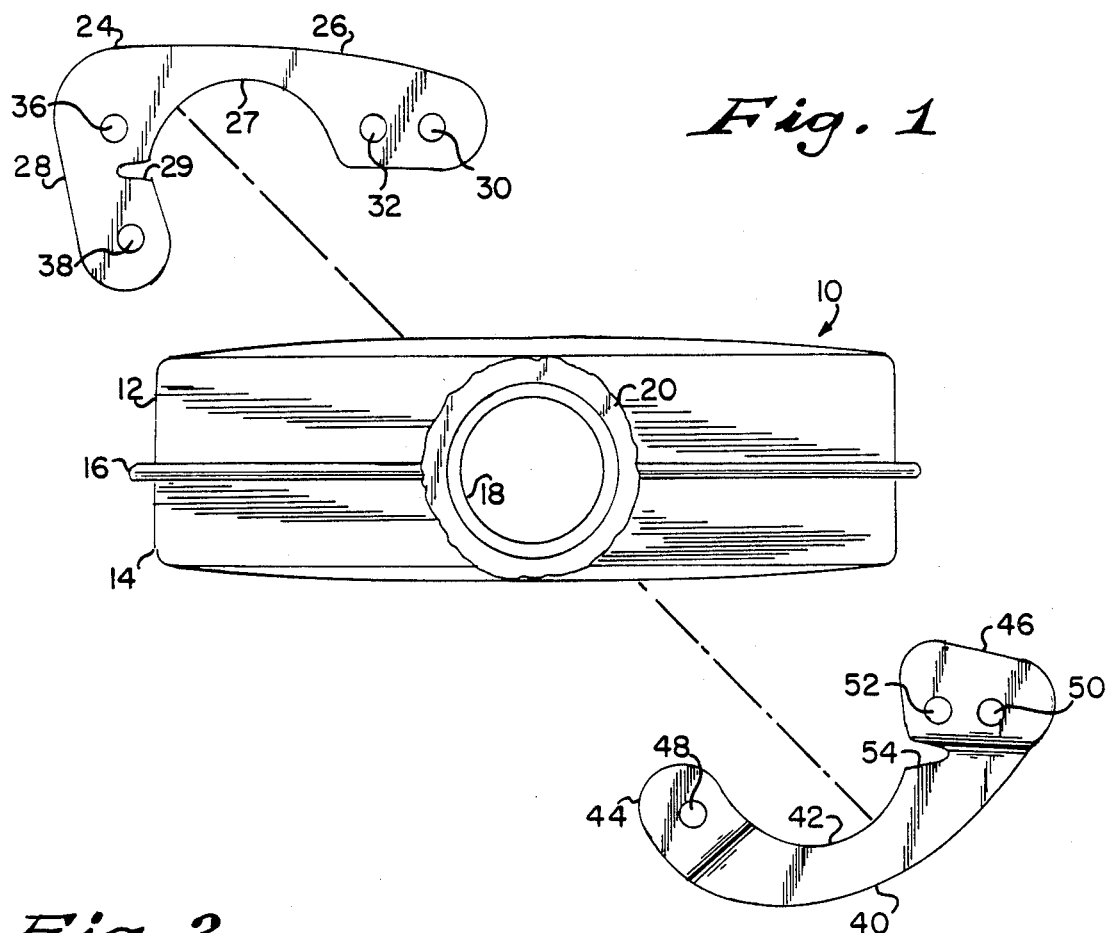
FIG. 1 is an end view of the catalytic converter and an exploded view of the multiple piece flange constructed according to the invention.
Figure 2:
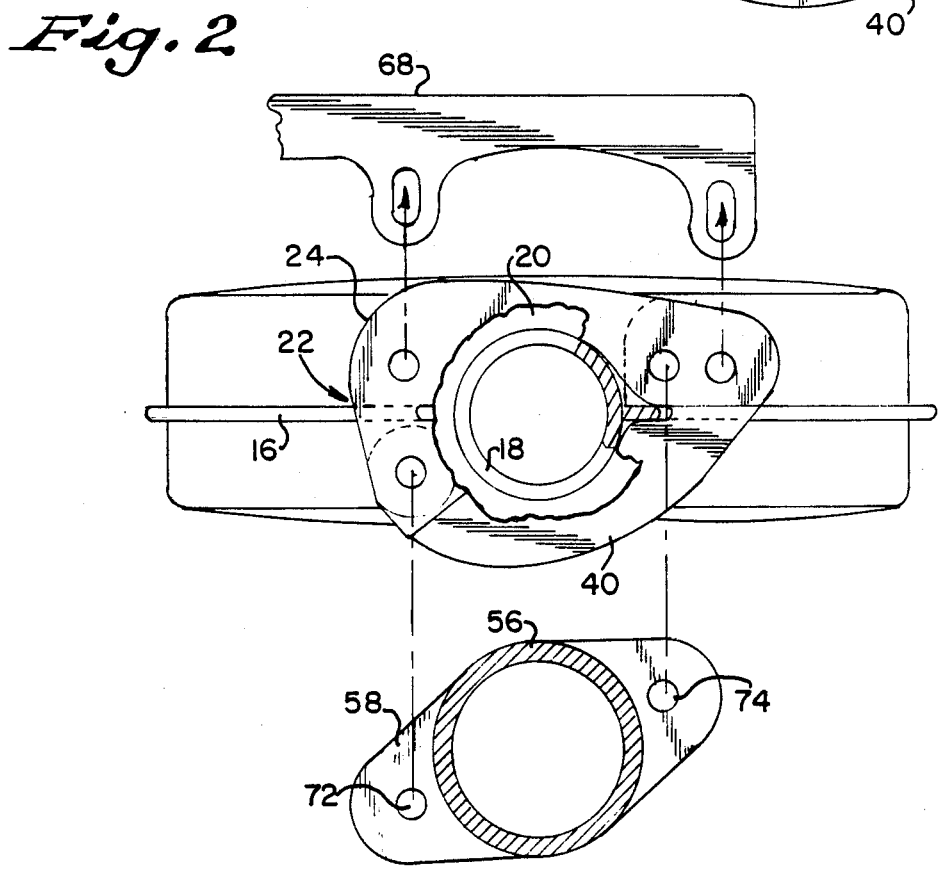
FIG. 2 is an end view of a catalytic converter with the flange of the invention installed thereon and with the flange of the exhaust pipe exploded downwardly and the suspension bracket exploded upwardly.
Figure 3:
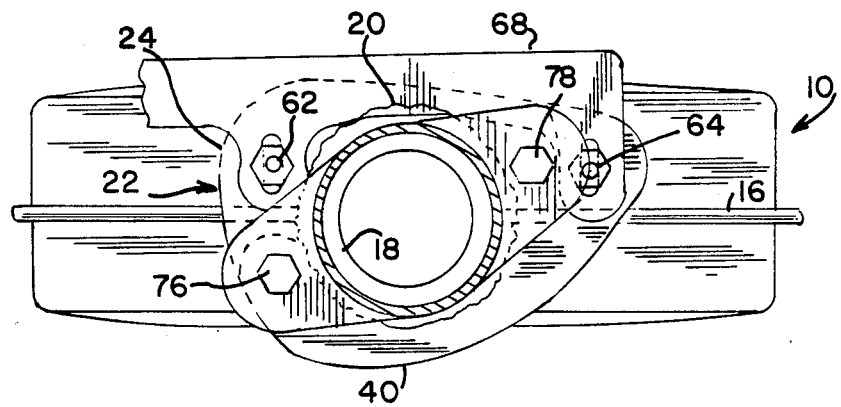
FIG. 3 is an end view of a catalytic converter with the multiple piece flange of the invention in an assembled state.
Figure 4:
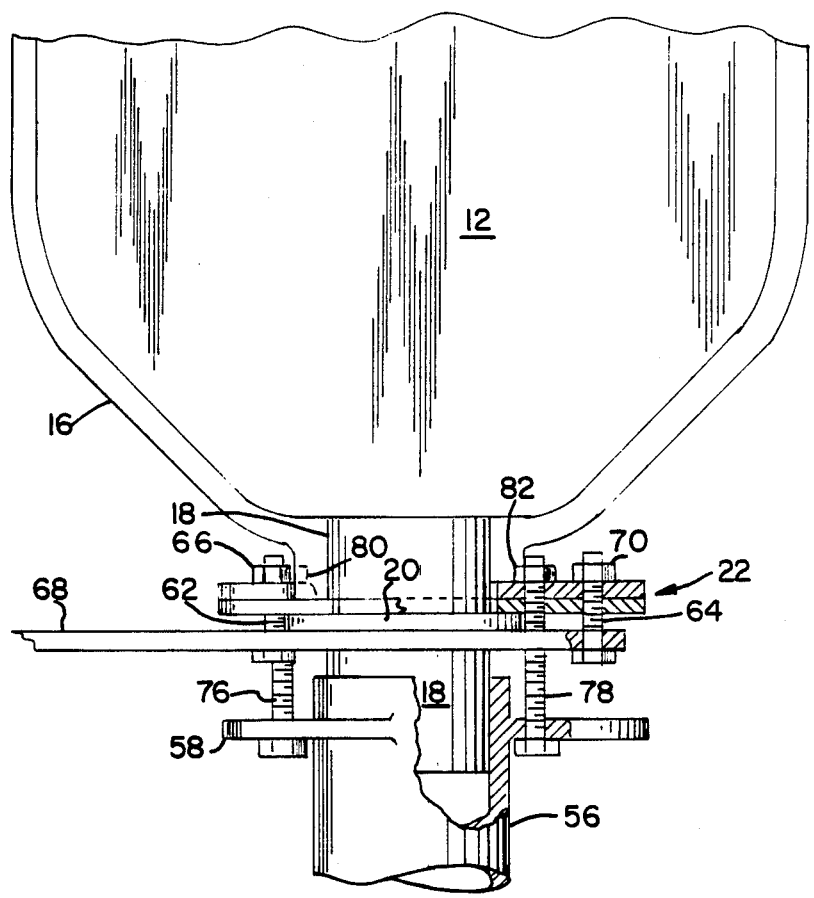
FIG. 4 is a plan view of a catalytic converter connected to an exhaust pipe through the use of the multiple piece flange of the invention.

As seen in FIG. 1, a catalytic converter 10 has an upper half 12 and a lower half 14 joined in a manner so as to provide a web 16 which extends out from converter body 10 and runs along the circumference of the converter.

Integral with and extending out from converter body 10 is catalytic converter outlet pipe 18. As originally manufactured, catalytic converter 10 has a flange (not shown) welded to outlet pipe 18. When this flange corrodes and fails and the flange of the present invention is installed the old flange is removed from catalytic converter 10 but the weld 20 from the original flange is allowed to remain on outlet pipe 18.

Multiple piece flange 22 includes a flange piece 24 that is substantially L-shaped and is specifically designed to fit the upper and left hand side of outlet pipe 18. More specifically, the longer leg 26 of L-shaped flange piece 24 has an arcuate inner edge 27 that mates with the curved surface of outlet pipe 18. The shorter leg 28 of flange piece 24 has a groove 29 along its inner edge that mates with web 16 on catalytic converter 10. The end of longer leg 26 is provided with holes 30 and 32. Hole 30 aligns with a corresponding hole in the second flange piece and is used to connect the two flange pieces to each other and to a bracket suspended from the under frame of the automobile. Similarily hole 32 aligns with a corresponding hole in the second flange piece and is used to connect the flange to the tailpipe flange.

Similarily, shorter leg 28 of flange piece 24 is provided with holes 36 and 38 with hole 36 being a bracket mounting hole and hole 38 aligning with a corresponding hole in the second flange piece which in turn aligns with a hole in the tailpipe flange.

Integral second flange piece 40 has an arcuate portion 42 that conforms to the curved surface of outlet pipe 18 and has enlarged end portions 44 and 46. End portion 44 includes a hole 48 that aligns with hole 38 in first flange piece 24.

Similarily, end portion 46 contains holes 50 and 52 that align with holes 30 and 32 in first flange piece 24.

As in flange piece 24, end portion 46 is provided with a groove 54 which accepts web 16 on converter 10 when the flange is in an assembled condition.

End portions 44 and 46 are offset from arcuate portion 42, i.e. not in the same plane, so that when flange piece 24 and flange piece 40 are placed in an overlapping relationship for assembly, a uniform plane surface is provided for engagement with weld 20 on outlet pipe 18.

The original equipment flange on a catalytic converter is typically the piece that fails first due to corrosion. Multiple piece flange 22 allows for the replacement of this flange and eliminates the need to replace the entire catalytic converter once the original equipment flange has failed.

To install multiple piece flange 22 the muffler pipe 56 and its flange piece 58 are removed from catalytic converter 10 and the original flange (not shown) is removed from catalytic converter 10 while weld 20 is allowed to remain on outlet pipe 18.

Second flange piece 40 is then placed about the lower half of outlet pipe 18 so that arcuate portion 42 engages the curved surface of the lower half of cylindrical outlet pipe 18 and groove 54 engages web 16.

First flange piece 24 is then placed on the upper half of cylindrical outlet pipe 18 so that holes 30, 32 and 38 align with holes 50, 52 and 48 respectively in flange piece 40 and groove 29 engages web 16.

Bolts 62 and 64 are then inserted through holes 36 and overlapping holes 30 and 50.

Bolt 62 which is secured with nut 66 connects one side of flange assembly 22 to bracket 68 while bolt 64 which is secured by nut 70 serves to join flange pieces 24 and 40 and to connect the other side of flange assembly 22 to bracket 68.

Tailpipe flange piece 58 and its holes 72 and 74 are then aligned with flange piece 24 and overlapping holes 38-48 and 32-52.

Bolts 76 and 78 are then placed through the aligned holes and secured with nuts 80 and 82. Muffler pipe 56 is thus connected to flange assembly 24.

Various modes for carrying out the invention are contemplated as being within the scope of the following claims particularly pointing out and distinctly claiming the subject matter which is regarded as the invention.

We claim:

1. A multiple piece converter flange for replacement of the original welded flange on a catalytic converter used to join the catalytic converter to a muffler pipe flange,
    where the catalytic converter has upper and lower halves joined so as to form a web extending outwardly from and running along the circumference of the converter and having a cylindrical outlet, said multiple piece converter flange comprising:
    a first converter flange piece having an arcuate edge portion for mating with a portion of the cylindrical outlet of the catalytic converter and having a plurality of openings for alignment with corresponding openings on a second converter flange piece, corresponding openings on the muffler pipe flange and corresponding openings on a support bracket and
    a second converter flange piece having an arcuate edge portion for mating with another portion of the cylindrical outlet of the catalytic converter and having a plurality of openings for alignment with corresponding openings on said first converter flange piece, corresponding openings on the muffler pipe flange and corresponding openings on a support bracket.

2. The multiple piece converter flange defined in claim 1 wherein said first converter flange piece includes a groove for engagement with the web extending outwardly from the side of the catalytic converter.

3. The multiple piece converter flange defined in claim 1 wherein said second converter flange piece includes a groove for engagement with the web extending outwardly from the side of the catalytic converter.

4. A multiple piece converter flange for replacement of the original welded flange on a catalytic converter used to join the catalytic converter to a muffler pipe flange,
    where the catalytic converter has upper and lower halves joined so as to form a web extending outwardly from and running along the circumference of the converter and having a cylindrical outlet, said multiple piece converter flange comprising:
    a first converter flange piece having an arcuate edge portion for mating with a portion of the cylindrical outlet of the catalytic converter and having a plurality of openings for alignment with corresponding openings on a second converter flange piece, corresponding openings on the muffler pipe flange and corresponding openings on a support bracket and a groove for engagement with the web extending outwardly from the side of the catalytic converter and
    a second converter flange piece having an arcuate edge portion for mating with another portion of the cylindrical outlet of the catalytic converter and having a plurality of openings for alignment with corresponding openings on said first converter flange piece, on the muffler pipe flange and on a support bracket and a groove for engagement with the web extending outwardly from the side of the catalytic converter.

5. A multiple piece converter flange for replacement of the original welded flange on a catalytic converter used to join the catalytic converter to a muffler pipe flange,
    where the catalytic converter has upper and lower halves joined so as to form a web extending outwardly from and running along the circumference of the converter and having a cylindrical outlet, said multiple piece converter flange comprising:
    a first substantially L-shaped converter flange piece having a long leg and a short leg with the long leg having an arcuate edge for engagement with a portion of the outer surface of the cylindrical outlet of the catalytic converter and with the short leg having a groove for engagement with the web extending from the side of the catalytic converter,
    a second converter flange piece to be joined to said first converter flange piece, said second converter flange piece having a pair of end portions separated by an arcuate portion that engages another portion of the outer surface of the cylindrical outlet of the catalytic converter, said second converter flange piece having a groove for engagement with the web extending from the side of the catalytic converter and
    means for joining said first and second converter flange pieces
    said first and second converter flange pieces when joined defining a cylindrical opening for accepting the outlet of the catalytic converter with said opening having opposing notches for accepting the web of the catalytic converter.

6. A multiple piece converter flange for replacement of the original welded flange on a catalytic converter used to join the catalytic converter to a muffler pipe flange,
    where the catalytic converter has upper and lower halves joined so as to form a web extending outwardly from and running along the circumference of the converter and having a cylindrical outlet, said flange comprising:
    a first converter flange piece having an arcuate edge portion for mating with a portion of the cylindrical outlet of the catalytic converter
    a second converter flange piece having an arcuate edge portion for mating with another portion of the cylindrical outlet of the catalytic converter means for joining said first and second converter flange pieces said first and second converter flange pieces when joined defining a cylindrical opening for accepting the outlet of the catalytic converter with said opening having opposing notches for accepting the web of the catalytic converter.

* * * * *